(12) United States Patent
Ku et al.

(10) Patent No.: US 11,541,534 B2
(45) Date of Patent: Jan. 3, 2023

(54) METHOD AND SYSTEM FOR OBJECT GRASPING

(71) Applicant: Intrinsic Innovation LLC, Mountain View, CA (US)

(72) Inventors: Li Yang Ku, Union City, CA (US); Michael Stark, Union City, CA (US); Ahmad Humayun, Union City, CA (US); Nan Rong, Union City, CA (US); Bhaskara Marthi, Union City, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 0 days.

(21) Appl. No.: 17/375,424

(22) Filed: Jul. 14, 2021

(65) Prior Publication Data

US 2022/0016765 A1    Jan. 20, 2022

Related U.S. Application Data

(60) Provisional application No. 63/149,180, filed on Feb. 12, 2021, provisional application No. 63/051,867, filed on Jul. 14, 2020.

(51) Int. Cl.
*G05B 15/00* (2006.01)
*G05B 19/00* (2006.01)
(Continued)

(52) U.S. Cl.
CPC ............... *B25J 9/1612* (2013.01); *B25J 9/08* (2013.01); *B25J 9/1697* (2013.01);
(Continued)

(58) Field of Classification Search
CPC .......... B25J 9/1612; B25J 9/08; B25J 9/1697; G06T 7/73; G06T 2207/20081;
(Continued)

(56) References Cited

U.S. PATENT DOCUMENTS

| 10,906,188 B1* | 2/2021 | Sun ........................... B07C 5/36 |
| 2016/0101519 A1* | 4/2016 | Kopicki ................. B25J 9/1612 |
| | | 700/254 |

(Continued)

FOREIGN PATENT DOCUMENTS

| EP | 3405910 B1 | 11/2020 |
| WO | 2019097004 A1 | 5/2019 |

OTHER PUBLICATIONS

Morrison, Douglas, et al., "Closing the Loop for Robotic Grasping: A Rea-time, Generative Grasp Synthesis Approach", arXiv:1804.05172v2 [cs.RO] May 15, 2018.
(Continued)

*Primary Examiner* — Harry Y Oh
(74) *Attorney, Agent, or Firm* — Fish & Richardson P.C.

(57) ABSTRACT

A method for object grasping, including: determining features of a scene; determining candidate grasp locations; determining a set of candidate grasp proposals for the candidate grasp locations; optionally modifying a candidate grasp proposal of the set; determining grasp scores associated with the candidate grasp proposals; selecting a set of final grasp proposals based on the grasp scores; and executing a grasp proposal from the set of final grasp proposals.

24 Claims, 6 Drawing Sheets

(51) Int. Cl.
 *B25J 9/16* (2006.01)
 *B25J 9/08* (2006.01)
 *G06T 7/73* (2017.01)
 *G05B 19/4155* (2006.01)
 *G06N 3/08* (2006.01)

(52) U.S. Cl.
 CPC ........... *G05B 19/4155* (2013.01); *G06N 3/08* (2013.01); *G06T 7/73* (2017.01); *G05B 2219/39505* (2013.01); *G06T 2207/20081* (2013.01); *G06T 2207/20084* (2013.01)

(58) Field of Classification Search
 CPC ...... G06T 2207/20084; G05B 19/4155; G05B 2219/39505; G06N 3/08
 See application file for complete search history.

(56) References Cited

U.S. PATENT DOCUMENTS

| | | |
|---|---|---|
| 2018/0273297 A1 | 9/2018 | Wagner et al. |
| 2019/0248003 A1* | 8/2019 | Nagarajan ................ B25J 9/163 |
| 2019/0283249 A1 | 9/2019 | Komoda et al. |
| 2020/0061811 A1 | 2/2020 | Iqbal et al. |
| 2020/0094405 A1* | 3/2020 | Davidson ................ B25J 9/161 |
| 2020/0147798 A1 | 5/2020 | Toris et al. |
| 2020/0164505 A1 | 5/2020 | Boer et al. |
| 2020/0316782 A1* | 10/2020 | Chavez ..................... G06T 7/12 |
| 2020/0331709 A1* | 10/2020 | Huang ..................... B25J 9/163 |
| 2021/0023720 A1 | 1/2021 | Du et al. |
| 2021/0122586 A1 | 4/2021 | Sun et al. |
| 2021/0125052 A1 | 4/2021 | Tremblay et al. |

OTHER PUBLICATIONS

Zapata-Impata, Brayan, et al., "Fast geometry-based computation of grasping points on three-dimensional point clouds", International Journal of Advanced Robotic Systems, Apr. 2, 2019.

Li, Tong, et al., "Keypoint-Based Robotic Grasp Detection Scheme in Multi-Object Scenes", Sensors, 2021, 21, 2132, https://mdpi.com/journal/sensors, Mar. 18, 2021.

Ma, Xiaojian, et al., "PointNetGPD: Detecting Grasp Configurations from Point Sets", arXiv: 1809.06267, Sep. 17, 2018.

Zeng, Andy, et al., "TossingBot: Learning to Throw Arbitrary Objects with Residual Physics", IEEE Transaction on Robotics, arXiv:1903.11239v3, May 30, 2020.

* cited by examiner

METHOD AND SYSTEM FOR OBJECT GRASPING

CROSS-REFERENCE TO RELATED APPLICATIONS

This application claims the benefit of U.S. Provisional Application No. 63/051,867, filed 14, Jul. 2020 and U.S. Provisional Application No. 63/149,180, filed on 12, Feb. 2021, each of which is incorporated in its entirety by this reference.

TECHNICAL FIELD

This invention relates generally to the robotics field, and more specifically to a new and useful method for object grasping.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

Figure 1:
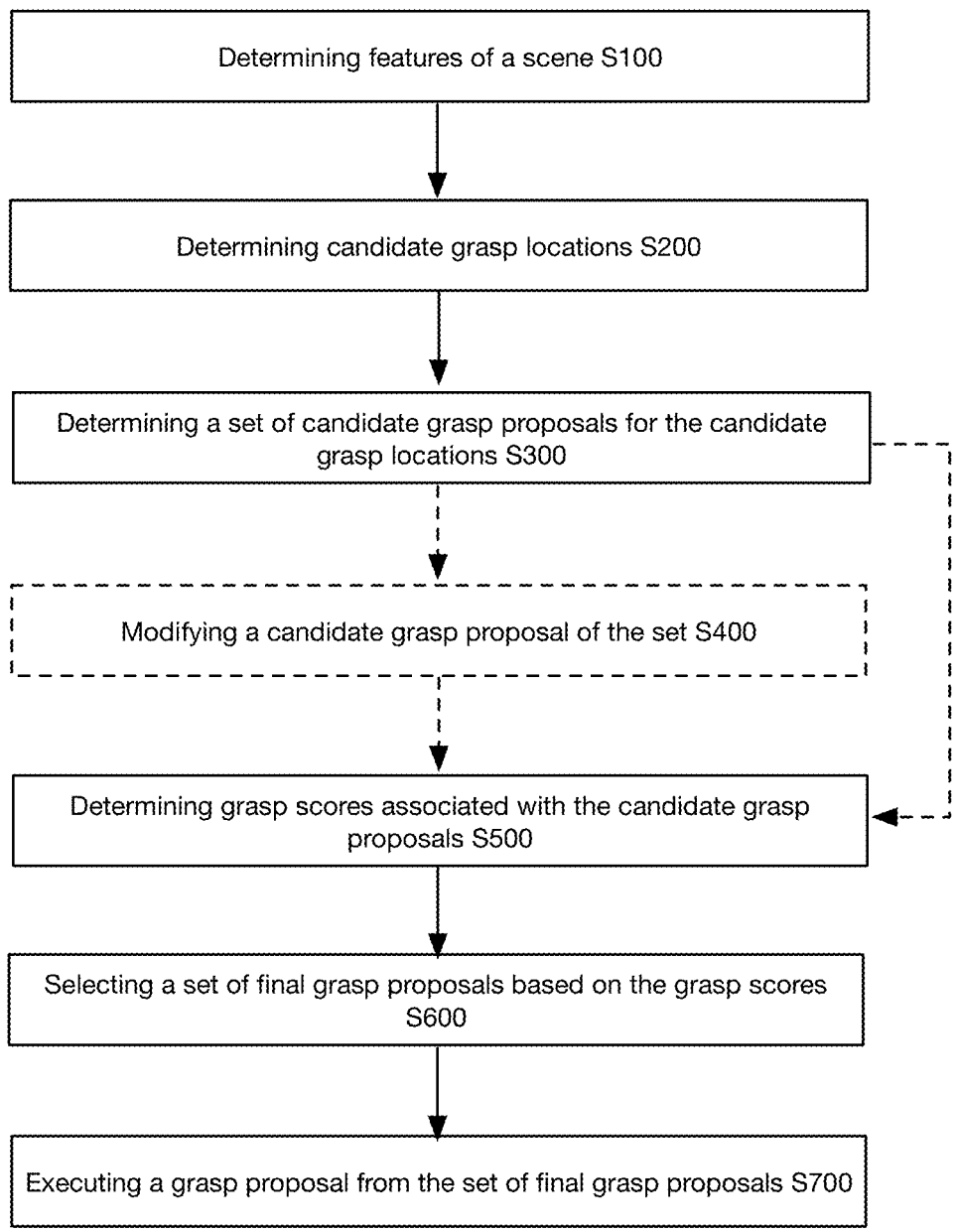
FIG. 1 is a schematic representation of the method.

As shown in FIG. 1, the method for object grasping preferably includes: determining features of a scene S100; determining candidate grasp locations S200; determining a set of candidate grasp proposals for the candidate grasp locations S300; optionally modifying a candidate grasp proposal of the set S400; determining grasp scores associated with the candidate grasp proposals S500; selecting a set of final grasp proposals based on the grasp scores S600; executing a grasp proposal from the set of final grasp proposals S700; and/or any other suitable elements.

Figure 2A:
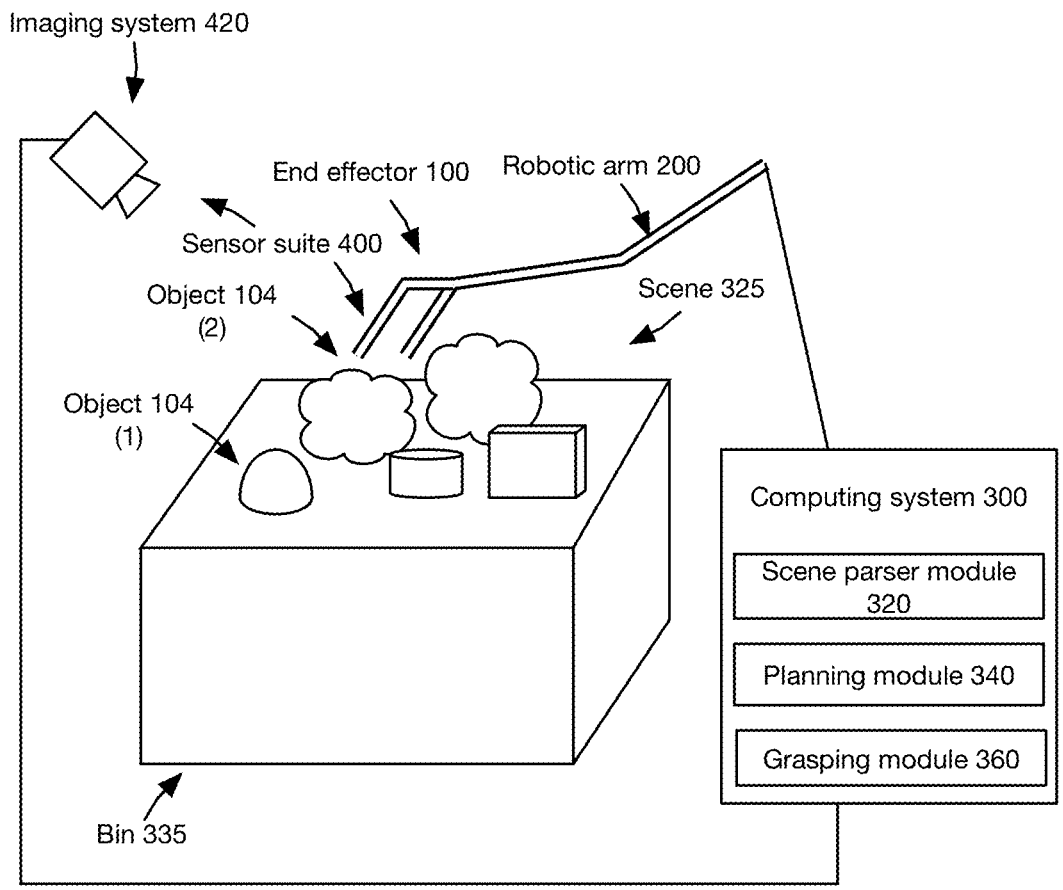
FIGS. 2A-B is a schematic representation of the system.
Figure 2B:
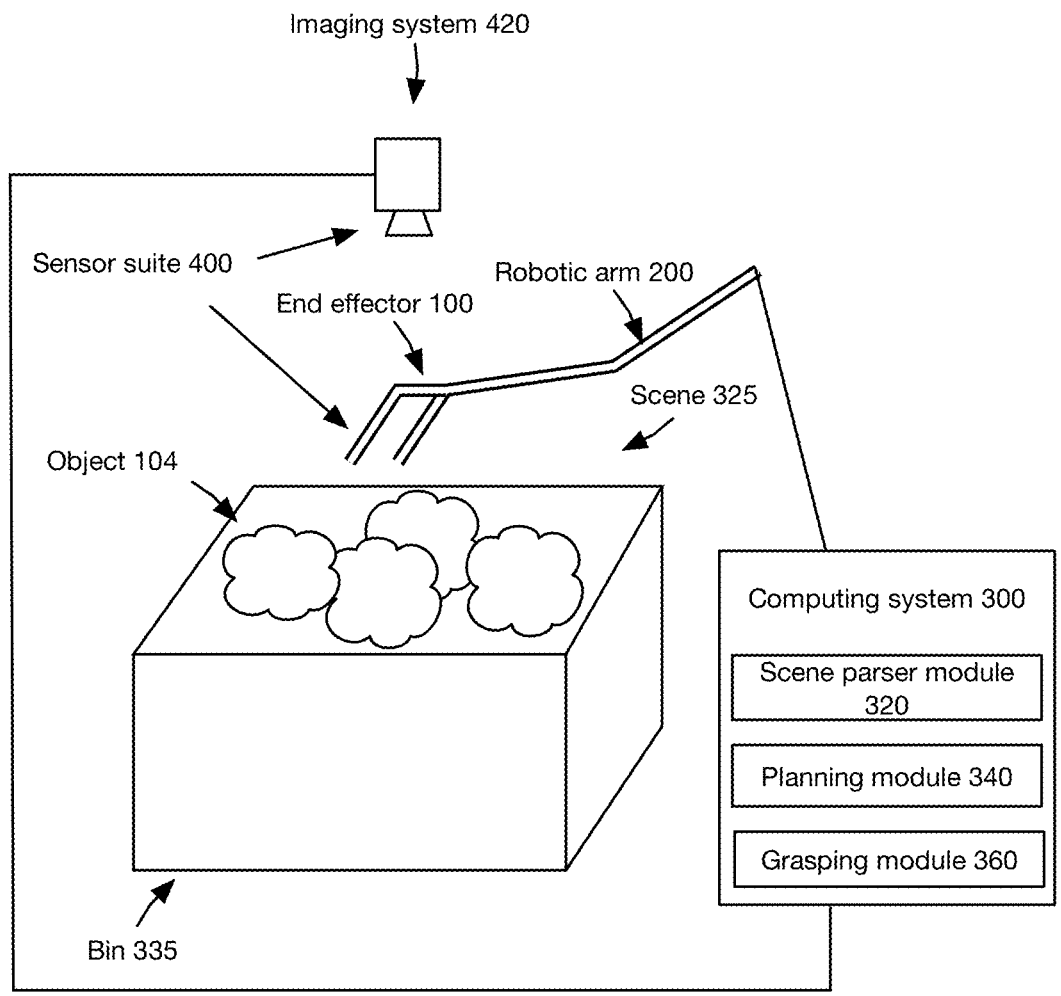

As shown in FIGS. 2A and 2B, the system for object grasping can include: an end effector 100, a robot arm 200, a computing system 300, a sensor suite 400, and/or any other suitable components.

2. EXAMPLES

Figure 3:
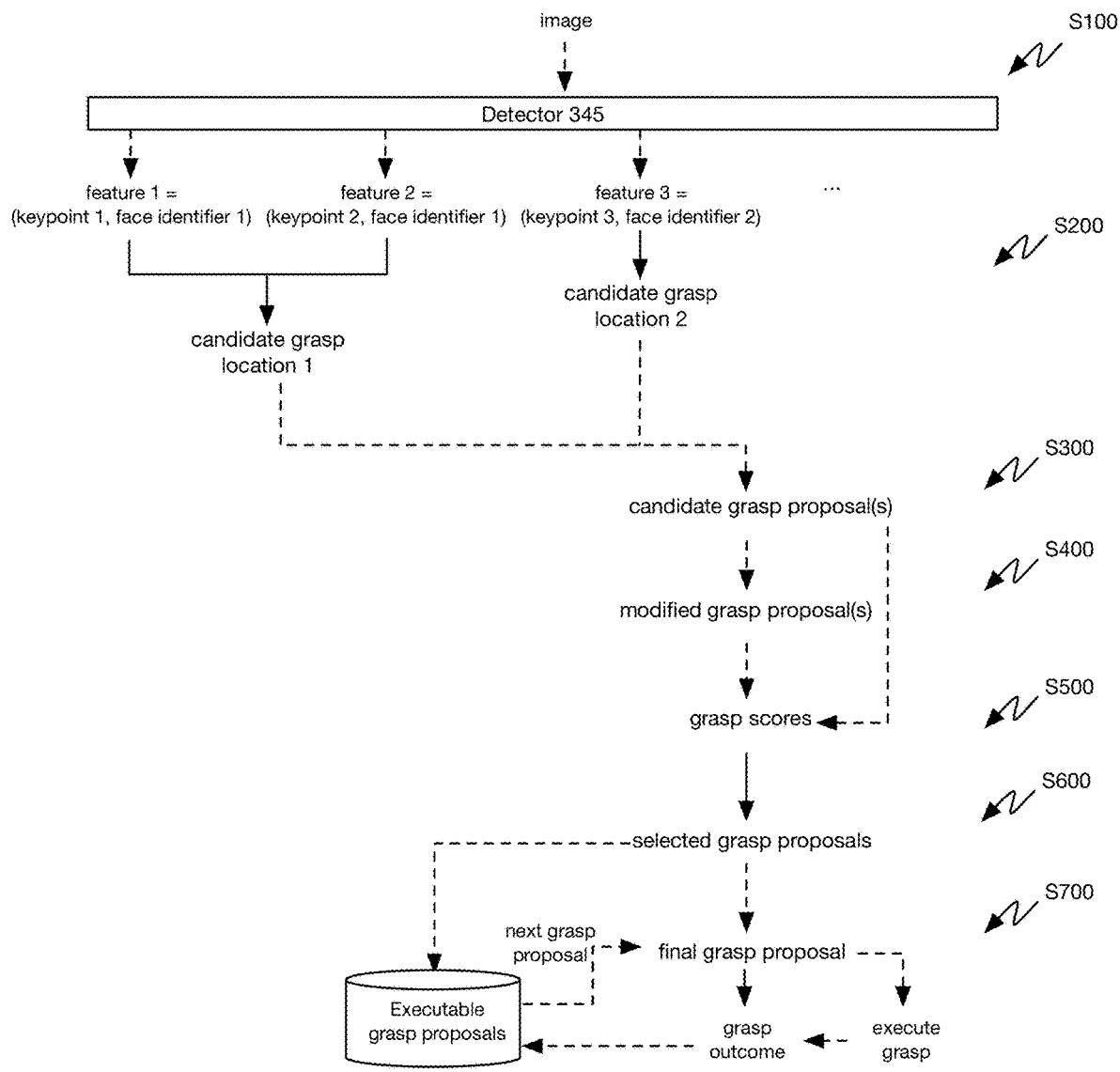
FIG. 3 depicts an embodiment of the method.

In one example (e.g., as depicted in FIG. 3), the method includes: sampling an image and depth information of a scene comprising a plurality of overlapping objects; determining known object keypoints (e.g., surface points, silhouette points, etc.), each labeled with an object component identifier (e.g., face tag or face label, part tag or part label, etc.), for each object within the image using a trained model (e.g., neural network); and optionally determining a mask for each object using the model.

The method can also include, for each detected object: optionally filtering the identified known object keypoints for nonoccluded keypoints (e.g., using an occlusion score or a mask of the other detected objects); determining a candidate grasp location (e.g., grasp keypoint) for a detected object from the identified known object keypoints (e.g., sharing a common object component identifier) (e.g., wherein a grasp location can be the mean location of the nonoccluded keypoints, the center of a convex hull over the nonoccluded keypoints, a point furthest from the edge of an object mask, etc.); optionally identifying a 3D grasp location by mapping the grasp location to a nearest point in the depth information (e.g., 3D point cloud); determining a candidate grasp proposals, including the grasp location and a grasp pose and optionally a pre-grasp pose, based on a normal vector of the 3D point determined from the depth information (e.g., the inverse of the surface normal of the 3D point based on its surrounding area); and optionally modifying the one or more candidate grasp proposals (e.g., based on a set of heuristics).

The method can also include: calculating a grasp score associated with the candidate grasp proposal (e.g., that represents the likelihood of success of grasping the object at the candidate grasp location with the grasp pose of the candidate grasp proposal); selecting a set of final grasp proposals based on the respective grasp scores; and executing a grasp proposal of the set using a robotic system (e.g., until a grasp proposal success, such as an object is grasped by the end effector; until the end of an operation session, such as the system is powered off; etc.).

The method can optionally include continuously generating sets of final grasp proposals; adding the sets of final grasp proposals to a queue; and continuously executing grasp proposals retrieved from the queue (e.g., until a grasp proposal success, until the end of an operation session, etc.).

In this example, the method can additionally or alternatively include, for each detected object: determining a mask from the object keypoints of the object; cropping the depth information (e.g., 3D point cloud) with the mask to obtain the 3D points for the object; calculating the principal component of the object based on the 3D points for the object; determining a pair of grasp points opposing each other across the principal component, wherein each grasp point of the pair is normal to the principal component and/or surface of the object proximal the respective grasp point. Each pair of grasp points can be treated as a grasp candidate.

3. BENEFITS

The method can confer several benefits over conventional systems.

First, variants of the system and method enable grasping an object from a bin of objects, wherein objects can be overlapping with other objects and in any random pose; from a shelf of objects; and/or from any other suitable grasping surface.

Second, variants of the system and method reduce accumulated errors from pose estimation. Additionally, the system is capable of grasping objects that are deformable and have different appearances instead of grasping objects using item pose estimation and/or grasp annotations.

Third, variants of the system and method enables object grasping for objects lacking a fixed appearance by using invariant features as inference features (e.g., instead of object poses or computer vision structural features). Conventional object grasping systems use object pose detectors trained on a standard appearance, which can easily be biased when the pin or label is at a different location. In a specific example, the method uses object keypoints with known locations relative to an object geometry, and does not use traditional object keypoints (e.g., SIFT, SURF, BRIEF keypoints) for grasp selection. These object keypoints can be associated with nonunique object regions or features (e.g., multiple keypoints can be associated with a smooth, featureless object surface).

Fourth, since variants of the method and system use invariant features for object grasping, the system and method can bypass intermediate 6D object pose estimation. For example, grasps can be computed without knowing or computing the 3D pose of the grasped object.

However, the method and system can confer any other suitable benefits.

4. SYSTEM

The method is preferably performed using the system, examples of which are depicted in FIGS. 2A and 2B, including: an end effector 100, a robotic arm 200, a computing system 300, a sensor suite 400, and/or any other suitable components.

The end effector preferably functions to grip an object. The end effector can be impactive, ingressive, astrictive, contigutive, and/or any other suitable type of end effector. In a first example, the end effector is a suction gripper. In a second example, the end effector is a claw gripper (e.g., dual prong, tri-prong, etc.). However, any other suitable type of end effector can be used. The end effector can be actuated: electrically (e.g., servo/motor actuation), pneumatically, hydraulically, unactuated (e.g., passive deformation based on motion of robotic arm, rigid body, etc.), and/or otherwise actuated. However, the system can include any other suitable end effector. The end effector is preferably mounted to the robotic arm, but can additionally or alternatively be mounted to and/or transformed by any suitable actuation mechanism(s) (e.g., CNC gantry system, etc.) and/or in any suitable actuation axes (e.g., 6-axis robotic actuation). However, the end effector can be otherwise configured.

The robotic arm preferably functions to position and/or articulate the end effector for grasping an object, but can additionally or alternatively provide any other suitable functionality. The robotic arm can be articulated by automatic control and/or can be configured to automatically execute control instructions (e.g., control instructions determined based on the grasp point, dynamically determined control, etc.), however the system can alternatively be otherwise suitably controlled and/or otherwise suitably enable end effector articulation. The robotic arm can include any suitable number of joints which enable articulation of the end effector in a single degree of freedom (DOF). The arm preferably includes 6 joints (e.g., a 6-axis robotic arm), but can additionally or alternatively include seven joints, more than seven joints, and/or any other suitable number of joints. However, the robotic arm can be otherwise configured The computing system 300 is preferably configured to perform all of (or a subset thereof) the method, but can additionally or alternatively provide any other suitable functionality. The computing system can be local to the robot arm, remote, and/or otherwise located. The computing system can include a control system, a motion planner, one or more modules, and/or any other suitable components.

The computing system can include a control system, which can control the robotic arm, end effector, imaging systems, and/or any other system component. The control system can be wirelessly connected, electrically connected, and/or otherwise connected to one or more components of the system. However, the computing system can be otherwise configured.

The computing system can include a motion planner, which can be configured to determine control instructions for the robotic arm to execute a grasp attempt for a selected grasp proposal (e.g., the grasp proposal in S700). The motion planner can employ any suitable control scheme (e.g., feedforward control, feedback control, etc.). The control instructions can include a trajectory for the robotic arm in joint (or cartesian) coordinate space, and/or can include any other suitable control instructions (e.g., CNC waypoints, etc.). However, the computing system can include any other suitable motion planner, and/or can otherwise suitably effect motion/articulation of the end effector to execute a grasp attempt.

The computing system can include one or more modules, including: a scene parser module 320, a planning module 340, a grasping module 360, and/or any other suitable module. However, the computing system can be otherwise configured.

Figure 5:
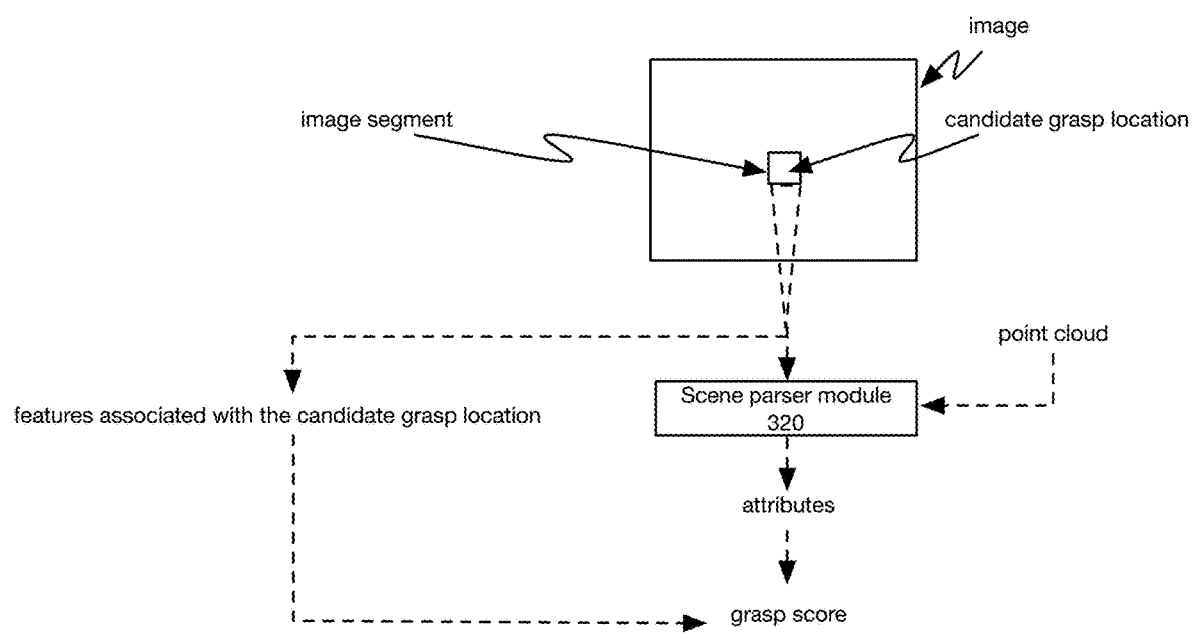
FIG. 5 depicts an embodiment of the method.

The scene parser module 320 can be configured to extract features from a measurement of a scene 325. In a first example, the scene parser module can be configured to determine a set of keypoint and object component identifier pairs for one or more objects in a scene (e.g., depicted in a measurement of the scene). In a second example (e.g., as shown in FIG. 5), the scene parser module can be configured to determine one or more attributes in an image segment (e.g., an image segment determined by projecting a candidate grasp location into the image). The scene parser module can include one or more detectors 345 (e.g., defined below in S100) and/or any other machine learning algorithms, but can additionally or alternatively extract features and/or attributes using heuristics, rules, and/or any other suitable technique. The scene parser module can optionally be configured to store extracted features from a first measurement of the scene and only parse areas of a second measurement of the scene that are different from the first measurement (e.g., because of grasp proposal execution, manual manipulation of the scene, etc.). However, the scene parser module can be otherwise configured.

The planning module 340 can be configured to determine a final grasp proposal (final grasp) based at least in part on the keypoints and/or object component identifiers. The final grasp proposal can be added to a set of grasp proposals that can be accessed by the grasping module to execute object grasps. The set of grasp proposals can be a queue, a list, an array, hash table, a stack, tree, and/or any other suitable data structure. The planning module can be configured to identify features as new (e.g., extracted from the second measurement of the scene that is different from the first measurement); generate grasps for the new features; and reuse previously generated grasps for the remaining features (e.g., features not identified as new). The planning module can be configured to continuously generate final grasp proposals and add the generated final grasp proposals to the set of executable grasp proposals. While the planning module continuously generates the final grasp proposals, the grasping module can concurrently execute grasp proposals retrieved from the set of grasp proposals (e.g., the planning and grasping module can execute in parallel) or the grasping module can execute the grasp received from the planning module (e.g., the planning and grasping modules can execute in series). However, the planning module can be otherwise configured.

The grasping module 360 can be configured to execute the grasp proposals (grasps) determined by the planning module. The grasping module can receive the grasp proposal from the planning module directly, retrieve the grasp from the set of grasp proposals, and/or otherwise determine a grasp to execute. The grasping module can be configured to continuously execute grasp proposals retrieved from the set of grasp proposals. However, the grasping module can be otherwise configured.

The sensor suite 400 can include imaging systems 420, actuation feedback systems, and/or any other suitable sensors. Actuation feedback sensors of the actuation feedback system preferably function to enable control of the robotic arm (and/or joints therein) and/or the end effector, but can additionally or alternatively be used to determine the outcome (e.g., success or failure) of a grasp attempt. Actuator feedback sensors can include one or more of a: force-torque sensor, gripper state sensor (e.g., to determine the state of the gripper, such as open, closed, etc.), pressure sensor, strain gage, load cell, inertial sensor, positional sensors, displacement sensors, encoders (e.g., absolute, incremental), resolver, Hall-effect sensor, electromagnetic induction sensor, proximity sensor, contact sensor, and/or any other suitable sensors. However, the sensors can be otherwise configured. The sensor suite can include an imaging system which preferably functions to capture images of the inference scene, but can provide any other functionality. An imaging system can include: stereo camera pairs, CCD cameras, CMOS cameras, time-of-flight sensors (e.g., Lidar scanner, etc.), a range imaging sensors (e.g., stereo triangulation, sheet of light triangulation, structured light scanner, time-of-flight, interferometry, etc.), and/or any other suitable sensor. The sensors can be arranged into sensor sets and/or not arranged in sets. The imaging systems can determine one or more RGB images, depth images (e.g., pixel aligned with the RGB, wherein the RGB image and the depth image can be captured by the same or different sensor sets). Imaging sensors are preferably calibrated within a common coordinate frame (i.e., sensor coordinate frame) in a fixed/predetermined arrangement relative to a joint coordinate frame of the robotic arm, but can be otherwise suitably configured. Sensors of the sensor suite can be integrated into the end effector, the robotic arm, and/or any other component of the system, or can be otherwise mounted to a superstructure (e.g., above a picking bin/container, camera directed toward a picking bin, etc.), mounted to the robotic arm, mounted to the end-effector, and/or otherwise suitably arranged. However, the sensor suite can be otherwise configured.

5. METHOD

The method for fast and performant object grasping can include: determining features of a scene S100; determining candidate grasp locations S200; determining a set of candidate grasp proposals for the candidate grasp locations S300; optionally modifying a candidate grasp proposal of the set S400; selecting a final grasp proposal from the candidate grasp proposals; executing a grasp proposal from the set of final grasp proposals S700; and/or any other suitable elements.

The method is preferably performed by the system disclosed above, but can be otherwise performed.

All (or portions) of the method for object grasping can be performed: when the robot arm is out of view of the imaging system, a next set of keypoints can be determined in the scene from which to perform S100-S700; during previously-grasped object insertion into a target location; after a prior grasp is successfully executed; and/or at any other suitable time.

Figure 4:
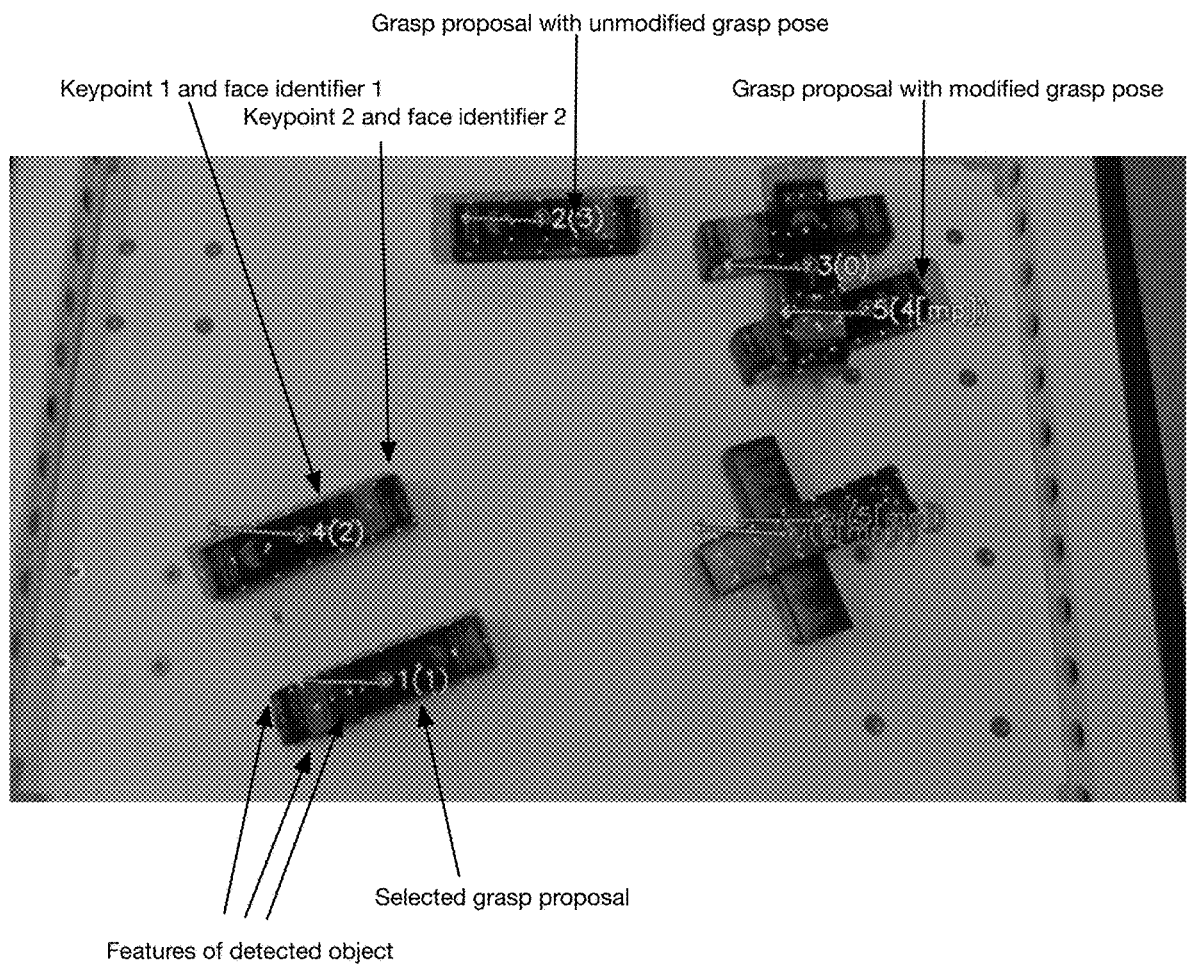
FIG. 4 depicts an example of a scene.

The objects 104 can be overlapping or non-overlapping, in a random pose or in a predetermined pose, and/or otherwise arranged. The objects can be homogeneous (e.g., identical and/or duplicative instances of a particular type of object; same object class—cylinders, spheres, similar pill bottles with different labels, etc.) or heterogenous. The objects can be: rigid, deformable, matte, transparent, reflective, and/or have any other suitable property. Object examples include: containers, bottles, toys (e.g., plush, metal, plastic, etc.), food, and/or any other suitable object. The objects can be arranged as part of a scene (e.g., as depicted in FIGS. 2A-B and FIG. 4).

The scene 325 (e.g., physical, virtual, etc.) can include: a bin 335, a surface, one or more objects 104, or no objects (e.g., the bin or the surface is empty), and/or any other suitable components. The scene is preferably a 'dense' object scene, which can include a plurality of overlapping objects (e.g., where one or more objects are occluded by another object within the scene; the scene can include a first plurality of objects that partially occludes a second plurality of objects; etc.). In a specific example, the vertical (top down) projection of a first object partially overlaps a second object within the scene. However, scenes can additionally or alternatively include sparse objects which are separated by at least a threshold distance, non-overlapping, non-occluded objects, or can include any other suitable object distribution. The scene preferably encompass a plurality of objects, but can additionally or alternatively encompass individual objects, no objects, and/or any other suitable object.

Determining features of a scene S100 can function to extract features (e.g., feature type, feature location, etc.) of an object that can be used to determine a grasp proposal for the object. The features are preferably invariant to object pose (e.g., features do not change with different object poses; features identify specific portions of the object; features are static relative to the object; etc.), but can alternatively vary based on the object pose. For example, features can include corners of a bag, so no matter the pose of the bag in the scene, the features can be detected and a grasp proposal can be determined based on the features (e.g., a grasp point can be the center point between non-occluded corners). S100 preferably determines one or more features per object, per object component (e.g., object part; object face, such as an object surface; etc.), and/or per any other scene component. The features are preferably determined during an operation session (e.g., when the system is powered on), when a physical configuration of a scene is new and/or different from a past physical configuration, continuously determined, determined after prior grasp execution, determined during prior grasp execution, and/or performed at any other suitable time.

The features are preferably keypoints, but can additionally or alternatively be object masks, such as a mask of visible objects (e.g., occlusion mask), mask that includes non-visible portions of the objects, and/or any other suitable mask; texture patterns (e.g., pictures, texts, etc.); surface shape features (e.g., edges, corners, object shape, points along the object boundary, points along the object silhouette, etc.); haptic features, and/or any other suitable features.

The keypoints can include: bounding box keypoints for each object (or a subset thereof) in the scene (e.g., 8 keypoints), a center keypoint (e.g., center of the bounding box), object component keypoints (e.g., associated with an object face or object part), surface shape keypoints (e.g., keypoints on a particular surface shape features), and/or any other suitable keypoints.

The features are preferably associated with object component identifiers (e.g., face tags or face labels; "face tagged features"; associated with part tags or part labels; etc.), but can additionally or alternatively be associated with any other suitable label or information. The object component identifiers preferably associate a feature with a particular face or part of a particular object, but can additionally or alternatively associate a feature with a particular face or part across all objects depicted in the image, associate a feature with multiple faces or parts for an object (e.g., when the object component identifier represents multiple faces or parts of an object), and/or otherwise associate a feature with an object. Each face or part of a particular object is preferably associated with one object component identifier, but can additionally or alternatively be associated with multiple object component identifiers (e.g., when multiple object parts make up a single face of the object). However, the object component identifiers can be otherwise configured.

Each feature is preferably a 2D feature, but can additionally or alternatively be a 3D feature. When the features are 2D features, the 2D features can be mapped to a point cloud (e.g., predetermined, generated using the method, sampled in S100, etc.) to determine feature locations in 3D, but can alternatively not be mapped to the point cloud. The 2D features can be mapped to the point cloud based on alignment between 2D and 3D images captured by the imaging system, and/or using any other suitable technique. The points in the point cloud can be associated with surface normals (e.g., predetermined, or calculated based on the one or more images and/or contemporaneously sampled depth information), object component identifiers, and/or any other suitable information.

Each feature can optionally be associated with an occlusion score (e.g., whether or not the feature is visible). The occlusion score can be output by an occlusion detector, calculated using heuristics, rules, and/or otherwise determined. The occlusion detector can be a neural network, a regression, a clustering algorithm, and/or any other suitable machine learning algorithm. The occlusion detector can receive scene images as input and be trained to identify occlusion scores. The scene images can be labelled with predetermined occlusion scores and the detector can be trained to learn the labelled occlusion scores for objects depicted in the training images using gradient descent or other training techniques. The occlusion detector can be the same detector as detector 345 or a different separate detector. Alternatively, the occlusion detector creates a mask of other object instances in the pile, and determines whether an object instance's feature is occluded based on whether the mask overlaps the feature. The mask can be of: objects higher than the object instance of interest (e.g., determined from the depth mask), all other objects, and/or otherwise determined. The mask can be created using the object boundaries determined by the object detector for each object instance, using a predetermined mask for the object and rotating the mask to match each object instance, and/or otherwise created. However, the occlusion detector can be otherwise defined.

The occlusion score can be a percentage of object occlusion (e.g., amount of visible object), an object detection (e.g., binary indicator) from a detector, and/or otherwise represented. Each feature can be pre-associated with an object pose (relative to the camera). Each feature can be associated with one or more object component identifiers and/or other labels. The features on the same object face are preferably associated with the same object component identifier, but can be associated with different object component identifiers (e.g., when 2 parts of an object make up the same face). However, the occlusion score can be otherwise determined or defined.

The features are preferably determined based on images of the scene, but can additionally or alternatively be determined based on video of the scene, and/or any other suitable measurement. The images can be captured by the one or more imaging systems, retrieved from a database (e.g., images of the scene stored during a previous cycle of the method), and/or otherwise determined.

Determining features can optionally include determining differences between physical configurations in the scene (e.g., using edge detectors, mean squared error, structural similarity index, etc.); and extracting features for only the areas in the scene where the physical configuration has changed (e.g., after grasp execution, after manual manipulation, etc.). Optionally, previously stored features and/or grasp proposals can be used for the unchanged areas.

Determining features can include: optionally determining a 3D point cloud and extracting the features by processing the one or more images and/or the point cloud using one or more detectors 345.

The detector 345 can function to detect objects, extract features, attributes, and/or other information from images and/or point clouds. The detector is preferably a convolutional neural network (CNN), but can additionally or alternatively be a fully connected neural network or other neural network, a logistic regression, sliding-window feature detector and/or classifier, a plane finder classifier, a learned graphical model (e.g., Recurrent Cortical Network (RCN), Bayesian network etc.), a clustering algorithm, an ORB feature detector, a probabilistic generative model and/or any other suitable feature detector.

The object detector can be a generative model, a discriminative model, and/or any other suitable object detector. In specific examples, the object detector can leverage one or more of: the architectures disclosed in U.S. application Ser. No. 15/461,748 filed 17, Mar. 2017, U.S. application Ser. No. 16/298,932 filed 11, Mar. 2019, and/or U.S. application Ser. No. 15/708,383 filed 19, Sep. 2017, each of which are incorporated in their entireties by this reference; RCN; CNNs (e.g., YOLO, R-CNN, R-FCN, etc.); histogram of gradients (HOG); single shot detectors (SSD); spatial pyramid pooling (SPP-net); and/or other models.

The object detector is preferably trained on synthetic images (e.g., trained using a set of artificially-generated object scenes), but can alternatively be trained on images of real scenes and/or other images. The synthetic images can be generated using the method disclosed in U.S. Pat. No. 11,275,942 titled "METHOD AND SYSTEM FOR GENERATING TRAINING DATA" filed 14 Jul. 2021, which is incorporated herein in its entirety by this reference, generated using another method, retrieved from a database, or otherwise generated.

The input to the detector is preferably a 2D image, but can additionally or alternatively be a depth map, point cloud, or any other suitable input. The output of the detector can be one or more features, object component identifiers (e.g., face labels, part labels, etc.), feature labels (e.g., silhouette labels, texture labels, haptic labels, etc.), one or more object masks, one or more scores (e.g., a visibility score for each object, for each feature, etc.), and/or any other suitable information.

However, the detector can be otherwise configured.

In a first variant, the features can be determined by a neural network trained to output keypoints and the associated object component identifiers of an object. Additionally or alternatively, the neural network can be trained to output object masks, occlusion scores, and/or any other suitable information.

In a second variant, the features can be determined by extracting planes using a plane finder detector; and identifying keypoints from the extracted planes (e.g., using keypoints for predetermined planes matching the extracted planes). The keypoints can alternatively be manually identified, or otherwise extracted.

In a specific example, determining features can include extracting keypoints and object component identifier pairs for objects depicted in an image, using an RCN model. The extracted keypoints for a particular object can be associated with a template that corresponds to a specific view of the object.

However, the features can be otherwise determined.

Determining candidate grasp locations S200 can function to determine where the end effector should be placed on a detected object before grasping the detected object. The candidate grasp location (e.g., grasp point, grasp position, etc.) can be determined based on the detected features for the object (e.g., from S100). Optionally, candidate grasp locations can be determined for a subset of the objects detected in S100 (e.g., objects with an occlusion score below a threshold, such as less occluded; objects near the top of the scene, such as based on the 3D point cloud mapping determined; etc.). Each candidate grasp location can be part of a different grasp proposal. Candidate grasp locations can be determined based on the identified features (e.g., retrieved using a look up table, calculated, etc.), be an identified feature (e.g., for suction grasping), and/or otherwise determined. One or more candidate grasp locations can be determined per image. For example, one or more candidate grasp locations can be determined: per object component identifier for a particular object or across all objects; per object; per scene; per grid cell, and/or the candidate grasp locations can be otherwise determined per image.

The candidate grasp locations can be determined based on the detected features from S100; based only on the changed areas in a physical configuration of a scene; based on predetermined candidate grasp locations (e.g., that were determined for an object with similar identified features); and/or based on any other suitable information.

In a first variant, the candidate grasp location can be determined by picking a center point of all of (or a subset thereof) the non-occluded keypoints (e.g., detected keypoints) in 2D and/or 3D.

In a second variant, the candidate grasp location can be determined by selecting a center of non-occluded keypoints of the same visible face (e.g., based on face tags associated with keypoints) in 2D and/or 3D.

In a third variant, the candidate grasp location can be determined by determining a convex hull of the 2D keypoints (e.g., for an object) and selecting a center of the convex hull as the candidate grasp location. Alternatively, the point cloud can be cropped with the convex hull and the centroid of the cropped point cloud can be selected as the candidate grasp location.

In a fourth variant, the candidate grasp location can be calculated using a distance transform to find a point furthest from an object's edges using one or more masks from the detector (e.g., masks determined in S100).

In a fifth variant, the candidate grasp location can be determined by calculating a principal component axis for an object and selecting a point along (e.g., center of) the principal component axis as the candidate grasp location (e.g., for the end effector to grab on either side of the principal component axis).

In a sixth variant, the candidate grasp location can be determined from past grasp location examples. Determining the candidate grasp location from past grasp location examples can include: identifying the position offsets between pairs of features and grasp locations that have low variance from a set of grasp examples of different objects of the same type with grasp outcome labels.

In a seventh variant, the candidate grasp locations can be calculated for only the new features from S100 associated with the changed areas in a physical configuration (and existing grasp locations for unchanged areas of the physical configuration can be used for the non-new features).

In an eighth variant, the candidate grasp location can be retrieved using predetermined grasp locations.

In a first specific example, when the keypoints are associated with a specific view of an object (e.g., from S100), the candidate grasp locations can be retrieved from a predetermined characterization of grasp locations as position offsets to feature positions in the specific view.

In a second specific example, candidate grasp locations can be retrieved using predetermined grasp locations associated with the features matching the detected features from S100.

However, the candidate grasp locations can be otherwise determined.

Determining a set of candidate grasp proposals for the candidate grasp locations S300 can function to determine information for grasping an object in the scene. A candidate grasp proposal can include: a grasp location on an object (e.g., from S200); a grasp pose for an end effector to grasp the object at the grasp location (e.g., 3D end effector position, orientation, etc.); a pre-grasp pose (e.g., a predetermined distance away from grasp pose, such as up to 5 cm, 10 cm, 15 cm, 20 cm, 25 cm, 30 cm, etc.); a post-grasp pose (e.g., grasp pose after the object is grasped, which can be the same pose as the pre-grasp pose or a different pose), a trajectory; a grasp force; a maximum force threshold; an end effector open position; an end effector closed position; and/or any other suitable information. The grasp proposal is preferably in 3D space (e.g., in the workspace coordinate system, robot coordinate system, etc.), but can alternatively be in 2D space (e.g., in the image coordinate system, etc.), 1D space or in any other suitable space. Each candidate grasp proposal can be associated with an object. Each object depicted in the image or located within the scene can be associated with a single grasp proposal, multiple grasp proposals, or no grasp proposals. All or parts of the grasp proposals can be predetermined, determined by the method, and/or otherwise determined. However, the candidate grasp proposals can be otherwise defined.

Optionally, S300 can include using previously generated candidate grasp proposals for features associated with areas of a physical configuration that remained unchanged after a grasp execution, manual manipulation, or other disruption to the objects in the scene.

S300 can include determining a grasp pose for each candidate grasp location (or a subset thereof). The grasp pose can be determined in 2D (e.g., based on the image alone), 3D (e.g., based on the point cloud and/or depth information from depth images), 6D (e.g., (x, y, z) position and orientations, determined based on the point cloud and/or depth information from depth images), and/or otherwise determined. The grasp pose can be calculated, learned (e.g., determined using a neural network, clustering algorithm, etc.), looked up (e.g., based on the object, based on the candidate grasp location on the object, etc.), and/or otherwise determined. The grasp pose can be the same or different for different end effectors.

When the end effector is a finger gripper, the grasp pose can be determined using one or more techniques.

In a first variant, the grasp pose for a given grasp point can be learned (e.g., through empirical testing).

In a second variant, the grasp pose can be determined by retrieving the point cloud; calculating a convex hull for an object of 2D face tagged features (or 3D distance to a tag feature mean), wherein the face tagged features can be determined using the detector; cropping the point cloud with the convex hull; calculating a principal component (e.g., component with the largest eigenvalue, largest principal component, etc.) of the cropped point cloud by performing PCA (principal component analysis) on cropped point cloud; determining a surface normal from cropped point cloud; and generating a grasp pose based on principal component and the surface normal (e.g., grasp pose is orthogonal to principal component and the surface normal).

In a third variant, the grasp pose can be determined by calculating object orientation and the object normal separately for the object associated with the candidate grasp point.

In a fourth variant, the grasp pose can be determined using PCA on 2D features determined in S100; and projecting the output of PCA into 3D using estimated surface normals (e.g., estimated from images, from PCA, received from S100, etc.). In a specific example, the grasp pose can be determined by techniques described in U.S. application Ser. No. 17/125,862 filed 17, Dec. 2020, which is incorporated herein in its entirety by this reference.

When the end effector is a suction gripper, the grasp pose and/or grasp orientation (e.g., gripper base to gripper tip direction) can be determined using one or more techniques.

In a first variant, the grasp orientation can be top-down with respect to the candidate grasp point (e.g., parallel with gravity).

In a second variant, the grasp orientation can be perpendicular to a grasp point surface (e.g., surface normal, determined from point cloud).

In a third variant, the grasp pose can be a learned position determined by a neural network trained on failed and/or successful grasps of a secondary robot frame (e.g., other than the end effector), which can be used to infer approach trajectory for grasping the object.

Optionally, S300 can include determining a pre-grasp pose after determining the grasp pose. The pre-grasp pose can have the same orientation as the grasp pose, wherein the end effector is a predetermined distance away from the candidate grasp location (e.g., up to 3 cm, up to 5 cm, up to 10 cm, up to 15 cm, up to 20 cm, more than 20 cm, etc.), along the opposite grasp direction (i.e., along the gripper tip to gripper base direction). However, the pre-grasp pose can be otherwise determined.

However, the set of candidate grasp proposals can be otherwise determined.

The method can optionally include modifying a grasp proposal of the set S400, which can function to adjust the grasp pose, pre-grasp pose, candidate grasp location, and/or any other information of the grasp proposal. Modifications to the grasp proposal can increase or decrease an evaluation of the grasp proposal, or have no effect on an evaluation of the grasp proposal (e.g., such as when the grasp scores are calculated in S500). The grasp proposal can be modified based on one or more heuristics, rules, and/or other methods.

In a first example, if the object is close to the edge of the bin, the grasp pose can be tilted a predetermined angle away from the wall of the bin (e.g., 10 degrees, 15 degrees, 20 degrees, 30 degrees, more than 30 degrees, between 10-30 degrees, between 15-25 degrees, less than lip degrees, etc.).

In a second example, if the grasp pose is a predetermined angle away from top down (e.g., up to 90 degrees, up to 50 degrees, etc.), the grasp pose can be tilted to top down.

In a third example, grasp proposals that are on surfaces with depths that vary outside of a predetermined range (e.g., the surface is not flat) can be removed (e.g., not considered during S600).

In a fourth example, the grasp pose of the grasp proposal can be modified by searching for a valid grasp pose with a smallest position change from the current grasp pose.

However, a grasp proposal can be otherwise modified.

The method can include selecting a final grasp proposal from the candidate grasp proposals. This can be performed after the candidate grasp proposals are generated, performed during S100-S400, and/or at any other suitable time. The set of candidate grasp proposals can include: the candidate grasp proposal from S300 and/or S400; previously determined candidate grasp proposals, such as those within a region distal the last grasped region (e.g., determined during a prior instance of the method; historical candidate grasp proposals); and/or any other suitable set of candidate grasp proposals.

Selecting a final grasp proposal from the candidate grasp proposals can include: determining grasp scores associated with the candidate grasp proposals S500 and selecting a set of final grasp proposals based on the grasp scores S600. However, the final grasp proposal can be selected: based on a set of heuristics (e.g., select the highest grasp proposal; grasp proposal with the closest-to-vertical grasp pose; etc.); randomly selected; selected using a voting algorithm; and/or otherwise selected.

Determining grasp scores associated with the candidate grasp proposals S500 can function to determine a likelihood of success that the object will be successfully grasped at a particular candidate grasp location with the end effector in the associated candidate grasp pose. The grasp score can be initialized to an integer, a real number, the occlusion score, and/or any other suitable value or not initialized.

In a first variant, the grasp scores can be calculated based on a combination (e.g., multiplication, addition, subtraction, etc.) of one or more heuristics, based on a rule set, based on a predetermined equation, looked up, or otherwise determined. The heuristics or rules can: minimize object edge grasping, minimize overlap grasping, minimize bin edge collision, achieve a goal (e.g., grasp selected to maximize the number of current and future grasps in the scene; grasp selected to achieve a target in-hand object pose and/or inserted object pose; increase probability of grasp success; etc.), and/or achieve other goals.

In a first example, the grasp score can be calculated based on an occlusion score received from the detector.

In a second example, the grasp score can be weighted based on the height of the object (e.g., objects close to the top of the bin are weighted to increase the grasp score).

In a third example, the grasp score can be weighted based on the angle of approach of the grasp pose (e.g., when the approach angle of the grasp pose is top down, the grasp score is weighted to increase the score; as the angle of approach tilts away from top down, the grasp score can be weighted to decrease the grasp score; etc.).

In a fourth example, the grasp score can be weighted based on a solution to inverse kinematics associated with the grasp pose (e.g., if a solution exists the weight is 1, and if no solution exists, the weight is 0).

In a second variant (e.g., as shown in FIG. 5), the grasp scores can be calculated by determining an image segment (e.g., segment can be the shape of the end effector suction gripper, a grid cell partitioned from the scene using a grid, any other suitable polygon) using a predetermined projection of the candidate grasp location in the image; identifying an attribute of the image segment; and generating the score based on the attribute. The attribute can be related to an object surface (e.g., surface smoothness), related to an object texture, and/or any other suitable attribute. The attribute can be an object occlusion score, a confidence score for a particular detection (e.g., output from the detector, calculated using the confidence scores and/or grasp outcomes over time, etc.), and/or any other suitable attribute. The attributes can be identified using heuristics, a rule set, and/or otherwise determined. For example, a predetermined grid (e.g., with a predetermined cell size, cell distribution, etc.) can be overlayed on an image and/or point cloud of the scene to subdivide the scene into a set of image segments and/or voxels. In this example, a candidate grasp can be determined for each grid cell (e.g., based on the image segment, using methods discussed above), wherein a final grasp can be selected from the resultant set of candidate grasps. Additionally or alternatively, in this example, a candidate gasp location (e.g., determined using the methods discussed above, considering the image as a whole) can be projected into the image and/or point cloud to determine an image segment for the candidate grasp location (e.g., image segment can be the size of a grid cell or any other suitable size). Attributes can be extracted from the image segment using the detector 345 and/or any other suitable detector, heuristics, rules, and/or otherwise determined. The attributes, for example, can be object smoothness (e.g., the depth information is within a predetermined range). When the object is smooth, the score can be higher than when the object is not smooth. However, the score for the candidate grasp location can be otherwise determined.

S500 can include calculating the grasp score associated with a particular grasp proposal based on the modification to the grasp proposal.

In a first example, the grasp score can be decreased if the modified grasp pose is a predetermined degree away from top down.

In a second example, the grasp score can be increased if the modified grasp pose is closer to top down than the previous grasp pose (e.g., calculated in S300).

In a third example, the grasp score can be decreased if the depths within a predetermined radius of the candidate grasp location are not within a predetermined range (e.g., the surface is not flat).

However, the grasp score can be otherwise determined.

Selecting a set of final grasp proposals S600 can function to select grasp proposals to send to the robotic controller for subsequent execution. The final grasp proposal can be selected based on the respective grasp scores (e.g., indicating a predetermined likelihood of grasp success); randomly selected; selected based on a set of heuristics (e.g., based on distance from the predicted end effector pose; based on distance from the prior grasp region; etc.); selected based on an optimization (e.g., for speed, maximize or minimize surrounding object disturbance, etc.); and/or otherwise selected. The set of final grasp proposals can be added to a set of executable grasp proposals that can be used by S700 to retrieve a grasp proposal for execution, and/or be sent to S700 directly. The set of executable grasp proposals can be a queue, a list, an array, hash table, a stack, tree, and/or any other suitable data structure.

In a first variant, selecting a set of final grasp proposals based on the grasp scores can include ranking the grasp proposals based on the grasp scores; and selecting the grasp proposals with the highest grasp scores (e.g., up to the top 3, up to the top 5, up to the top 10, up to the top 15, up to the top 20, etc.).

In a second variant, selecting a set of final grasp proposals can include generating a group of grasp proposals by filtering grasp proposals with a grasp score below a threshold out from consideration (e.g., below 0.4, below 0.5, below 0.6, below 0.7, etc.); and randomly selecting a grasp proposals from the group.

However, the set of final grasp proposals can be otherwise selected.

Executing a grasp proposal from the set of final grasp proposals S700 can function to grasp an object using information included in a grasp proposal. When the set of final grasp proposals includes multiple proposals, the grasp proposal can be selected based on the grasp score (e.g., highest grasp score), randomly selected, and/or otherwise selected. S700 can receive the set of final grasp proposals directly from S600, and/or retrieve one or more executable grasp proposals from a set of executable grasp proposals. When S700 retrieves grasp proposals from the set of executable grasp proposals, S700 can continuously execute grasp proposals concurrently with S100-S600 (e.g., concurrently with generating final grasp proposals). In a first variant, the grasp proposal is selected from the set of final grasp proposals generated from the same method instance (e.g., from the last image). In a second variant, the grasp proposal can be selected from a set of final grasp proposals including final grasp proposals from prior method instances (e.g., determined from prior images). In this variant, the system can keep selecting final grasps to execute from the set of final grasp proposals until there are no more proposed final grasps. In a first embodiment of this variant, the method is repeated when no final grasp proposals remain in the set. In a second embodiment of this variant, the method is continually repeated during successive final grasp execution, such that the set is continuously being replenished. In this second embodiment, when no final grasp proposals remain in the set, the method can optionally trigger scene perturbation (e.g., pile mixing, bin actuation, additional object addition, etc.) or otherwise manage an empty final grasp proposal queue.

Executing the grasp proposal can include calculating a trajectory by performing motion planning (e.g., from a current end effector position to the pre-grasp pose and from the pre-grasp pose to the grasp pose; from a current end effector position to the grasp pose and from the grasp pose to the post-grasp pose, etc.). Motion planning is preferably performed by the computing system, but can additionally or alternatively be performed by any other suitable system. The robot arm and end effector preferably perform object grasping (e.g., using direct execution; closed loop visual servoing, such as iteratively improving feature location based on better centered and more close up images until grasp success; etc.).

Executing the grasp proposal can optionally include determining a next trajectory for a next grasp proposal while executing the grasp proposal. The next grasp proposal can be the grasp proposal with the next best score, randomly selected, and/or otherwise determined.

If the grasp proposal fails (e.g., the force of the end effector is greater than a force threshold, the end effector travelled further than the object depth, etc.), the next grasp proposal can be executed. Additionally or alternatively, next grasp proposals can be executed after either grasp outcome (e.g., a grasp fail or a grasp success). Next grasp proposals can be executed until grasp success (e.g., the end effector grasps the object), the set of executable grasp proposals is empty, the operation session terminates, and/or any other suitable time.

If all grasp proposals fail, S700 can optionally include repositioning the scene and repeating the process (S100-S700). Repositioning the scene can include mixing the objects in the scene using the robot arm, manually mixing the objects in the scene, adding more objects to the scene, changing an object bin volume (e.g., by raising a bin base), and/or otherwise repositioning the scene.

S700 can optionally include saving images captured in S100 for re-use in a next iteration of the method or not saving images.

However, the grasp proposal can be otherwise executed.

In an illustrative example, the method for object grasping includes determining a set of keypoint and object component identifier pairs for each of a plurality of objects in a scene, using a neural network trained to output keypoints and the associated object component identifiers of an object; determining a set of candidate grasp locations, using the set of keypoint and object component identifier pairs; determining a set of candidate grasp proposals for the set of candidate grasp locations; scoring the candidate grasp proposals of the set; selecting a final grasp proposal based on the respective score; and executing the final grasp proposal. Optionally, the method can include, after final grasp proposal execution, using the set of keypoint and object component identifier pairs to determine additional final grasp proposals.

After executing the final grasp proposal, the method can include identifying areas in the inference scene affected by executing the final grasp proposal; and generating new keypoint and object component identifier pairs for only the identified areas.

Additionally or alternatively, after executing the final grasp proposal, the method can include identifying areas in the inference scene affected by executing the final grasp proposal; selecting a new set of candidate grasp locations based on the keypoints and object component identifier pairs for unaffected areas; and determining a new final grasp proposal for the new set of candidate grasp locations.

In the above example, the object component identifier can represent a face of the object and the set of keypoint and object component identifier pairs can include keypoints with different object component identifiers.

In a second illustrative example, the method can include: sampling an image and depth information of a scene comprising a plurality of overlapping objects; determining known object keypoints, each labeled with an object component identifier, for each object within the image using a trained model (e.g., neural network); optionally determining a mask for each object using the model.

In this example, the method can additionally or alternatively include: mapping the known object keypoints to known locations on a geometric model of the object (e.g., meshed object model); and calculating the object pose for each detected object relative to the scene, based on the identified object keypoints and the keypoints' respective locations on the geometric object model.

Embodiments of the system and/or method can include every combination and permutation of the various system components and the various method processes, wherein one or more instances of the method and/or processes described herein can be performed sequentially, in parallel, synchronously, asynchronously, or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method, comprising:
   determining a set of pairs of keypoints and object component identifiers for each of a plurality of objects in a scene, each pair of the set of pairs comprising a respective keypoint and a corresponding object component identifier;
   determining a set of candidate grasp locations, using the sets of pairs, wherein each candidate grasp location of the set of candidate grasp locations is associated with a respective occlusion score determined by a machine learning model trained on images labeled with predetermined occlusion scores for locations in the images;
   determining a set of candidate grasp proposals for the set of candidate grasp locations;
   scoring each of the candidate grasp proposals with a respective score;
   selecting a candidate grasp proposal from the set of candidate grasp proposals as a final grasp proposal based on the respective scores; and
   with a robot, executing the final grasp proposal.

2. The method of claim 1, wherein the sets of pairs are determined by a trained neural network, wherein the trained neural network is configured to output pairs of keypoints and corresponding object component identifiers of an object in a scene.

3. The method of claim 1, wherein each candidate grasp proposal of the set of candidate grasp proposals is scored at least partially based on the occlusion score.

4. The method of claim 1, wherein each keypoint in the set of pairs for an object of the plurality of objects is invariant to an object pose of the object.

5. The method of claim 1, wherein an object component identifier of the set of pairs represents a face of the object.

6. The method of claim 1, further comprising: adding the final grasp proposal to a set of final grasp proposals; wherein executing the final grasp proposal comprises retrieving a next grasp proposal from the set of final grasp proposals.

7. The method of claim 6, further comprising: repeatedly generating new final grasp proposals, in parallel with executing the final grasp proposal.

8. The method of claim 6, further comprising: storing the set of final grasp proposals as a queue.

9. The method of claim 1, further comprising, after executing the final grasp proposal, determining, using the sets of keypoint and object component identifier pairs, additional final grasp proposals.

10. The method of claim 1, further comprising:
    identifying areas in an inference scene affected by executing the final grasp proposal; and
    generating a new set of pairs of keypoints and object component identifiers for the identified areas.

11. The method of claim 1, further comprising:
    identifying areas in an inference scene affected by executing the final grasp proposal;
    selecting a new set of candidate grasp locations generated based on one or more pairs of keypoints and object component identifiers for unaffected areas from the set of pairs; and
    determining a new final grasp proposal for the new set of candidate grasp locations.

12. The method of claim 1, wherein determining the set of candidate grasp locations comprises, for each object of the plurality of objects: calculating a center of multiple keypoints each paired with a common object component identifier in the set of pair.

13. The method of claim 1, wherein the sets of pairs are identified using an image for the scene, and wherein scoring the set of candidate grasp proposals comprises:
for each candidate grasp proposal of the set of candidate grasp proposals, determining an image segment using a predetermined projection of the candidate grasp location in the image;
identifying an attribute of the image segment; and
generating a respective score for the candidate grasp proposal based on the attribute.

14. A system comprising:
one or more processors; and
one or more non-transitory machine-readable storage medium storing instructions that are executable by the one or more processors to cause performance of operations comprising:
determining a set of pairs of keypoints and object component identifiers for each of a plurality of objects in a scene, each pair of the set of pairs comprising a respective keypoint and a corresponding object component identifier;
determining a set of candidate grasp locations, using the sets of pairs, wherein each candidate grasp location of the set of candidate grasp locations is associated with a respective occlusion score determined by a machine learning model trained on images labeled with predetermined occlusion scores for locations in the images;
determining a set of candidate grasp proposals for the set of candidate grasp locations;
scoring each of the candidate grasp proposals with a respective score;
selecting a candidate grasp proposal from the set of candidate grasp proposals as a final grasp proposal based on the respective scores; and
with a robot, executing the final grasp proposal.

15. The system of claim 14, wherein the sets of pairs are determined by a trained neural network, wherein the trained neural network is configured to output pairs of keypoints and corresponding object component identifiers of an object in a scene.

16. The system of claim 14, wherein each candidate grasp proposal of the set of candidate grasp proposals is scored at least partially based on the occlusion score.

17. The system of claim 14, wherein each keypoint in the set of pairs for an object of the plurality of objects is invariant to an object pose of the object.

18. The system of claim 14, wherein an object component identifier of the set of pairs represents a face of the object.

19. The system of claim 14, wherein the operations further comprise: adding the final grasp proposal to a set of final grasp proposals; wherein executing the final grasp proposal comprises retrieving a next grasp proposal from the set of final grasp proposals.

20. The system of claim 14, wherein the operations further comprise: after executing the final grasp proposal, determining, using the sets of keypoint and object component identifier pairs, additional final grasp proposals.

21. The system of claim 14, wherein the operations further comprise:
identifying areas in an inference scene affected by executing the final grasp proposal; and
generating a new set of pairs of keypoints and object component identifiers for the identified areas.

22. The system of claim 14, wherein the operations further comprise:
identifying areas in an inference scene affected by executing the final grasp proposal;
selecting a new set of candidate grasp locations generated based on one or more pairs of keypoints and object component identifiers for unaffected areas from the set of pairs; and
determining a new final grasp proposal for the new set of candidate grasp locations.

23. The system of claim 14, wherein determining the set of candidate grasp locations comprises, for each object of the plurality of objects: calculating a center of multiple keypoints each paired with a common object component identifier in the set of pair.

24. The system of claim 14, wherein the sets of pairs are identified using an image for the scene, and wherein scoring the set of candidate grasp proposals comprises:
for each candidate grasp proposal of the set of candidate grasp proposals, determining an image segment using a predetermined projection of the candidate grasp location in the image;
identifying an attribute of the image segment; and
generating a respective score for the candidate grasp proposal based on the attribute.

* * * * *